April 2, 1946.  E. E. KROLL  2,397,550
INCLINOMETER
Filed March 6, 1943  2 Sheets-Sheet 1

Inventor
Ervin Edwin Kroll
By Clarence A. O'Brien
and Harvey B. Jacobson
Attorneys April 2, 1946.        E. E. KROLL        2,397,550
INCLINOMETER
Filed March 6, 1943        2 Sheets-Sheet 2
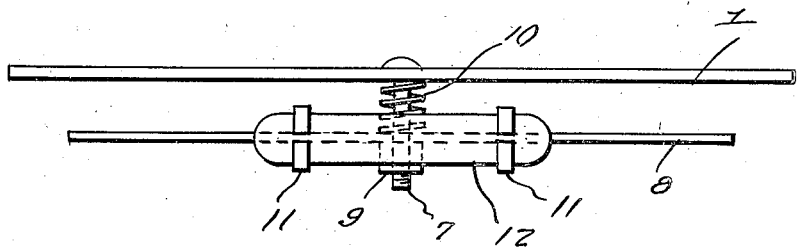
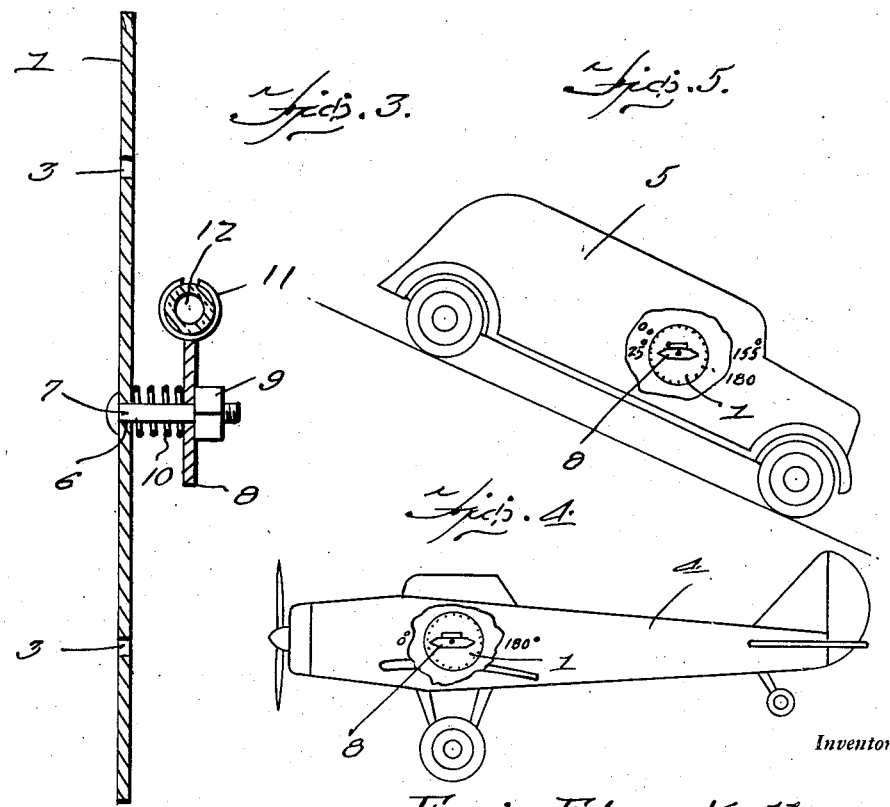
Inventor
*Ervin Edwin Kroll*
By *Clarence A. O'Brien
and Harvey B. Jacobson*
Attorneys Patented Apr. 2, 1946

2,397,550

UNITED STATES PATENT OFFICE 2,397,550

INCLINOMETER

Ervin Edwin Kroll, Randolph Field, Tex.

Application March 6, 1943, Serial No. 478,272

2 Claims. (Cl. 33—213)

The present invention relates to new and useful improvements in inclinometers, particularly for airplanes and motor vehicles, especially the former, and has for one of its important objects to provide, in a manner as hereinafter set forth, an instrument embodying novel means for assisting the pilot in putting the plane in position relative to the ground to make a correct landing.

Another very important object of the invention is to provide, in an inclinometer of the aforementioned character comprising a dial and a pivoted indicator cooperable therewith, a novel construction and arrangement for securing the indicator in adjusted position.

Other objects of the invention are to provide an inclinometer of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a top plan view of the instrument.

Figure 3 is a vertical sectional view, taken substantially on the line 33 of Figure 1.

Figure 4 is an elevational view, showing the instrument installed for use in an airplane.

Figure 5 is an elevational view, showing the device in use in a motor vehicle.

Figure 1:
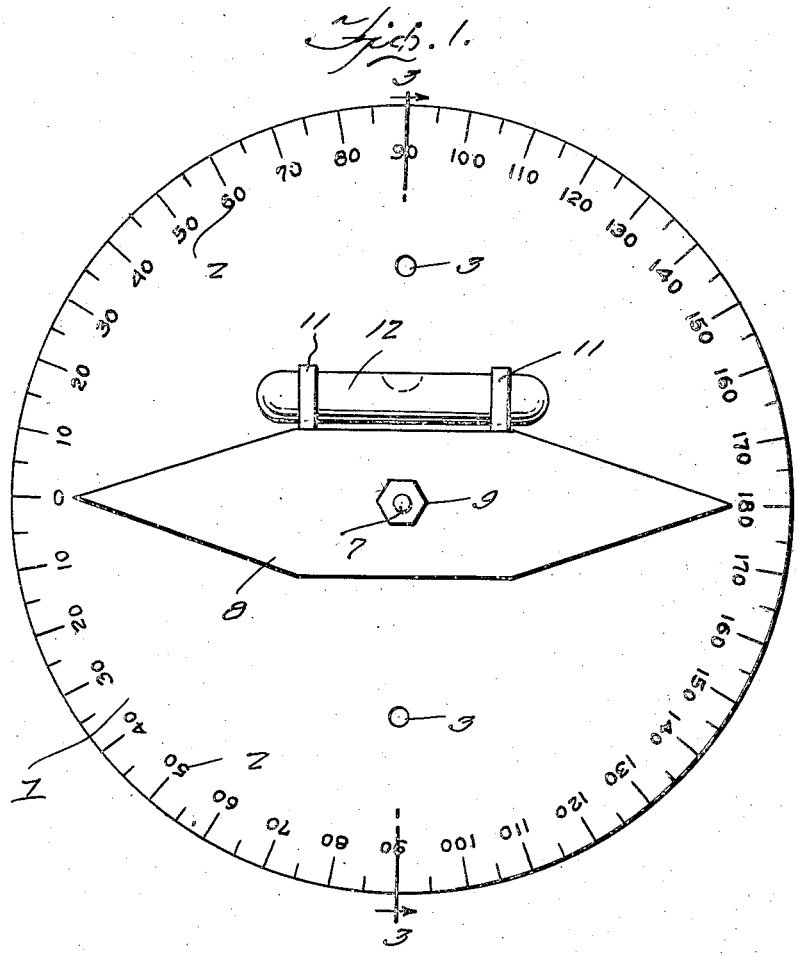
Figure 1 is a view in front elevation of an inclinometer constructed in accordance with the present invention.
Figure 6:
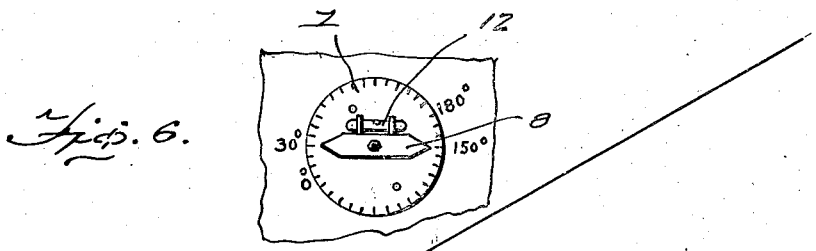
Figure 6 is a view in front elevation, illustrating the manner in which the instrument functions on a grade.

Referring now to the drawings in detail, it will be seen that the embodiment of the invention which has been illustrated comprises a dial 1 in the form of a disk of suitable diameter and material. The peripheral portion of the dial 1 is provided with degree scales 2. Openings 3 are provided in the dial 1 for the passage of securing elements for mounting the instrument in position for use, such, for example, as in an airplane 4 or a motor vehicle 5.

The dial 1 is further provided with a centrally located opening 6 which accommodates a forwardly projecting bolt 7. A double-ended indicator 8 is pivotally and slidably mounted on the bolt 7. A retaining nut 9 for the indicator 8 is threaded on the bolt 7. A coil spring 10 encircles the bolt 7 between the dial 1 and the indicator 8 and yieldingly urges the latter against the nut 9. Thus, the indicator 8 is frictionally secured in adjusted position. Also, the retaining nut 9 constitutes means for adjusting or regulating the tension of the coil spring 10.

Resilient clips 11 are provided on the upper edge of the indicator 8. The clips 11 provide means for mounting a spirit level 12 on the indicator 8 in parallelism therewith.

It is throught that the operation of the device will be readily apparent from a consideration of the foregoing. Briefly, when the instrument is to be used on an airplane, it is installed when the plane is in a level position, as when in flight, as seen in Figure 4 of the drawings. The airplane is then brought to its natural position at rest on the ground, the indicator 8 is leveled and the degree of inclination is observed on the dial 1. The inclination may be 20 degrees, for example. When the airplane is in flight and the pilot is about to make a landing, he sets the instrument to indicate an inclination of 20 degrees. then, the nose of the plane, just before landing, is brought up in a manner to level the indicator 8, as shown by the spirit level 12, and the pilot knows that the plane is in the correct position to make a three point landing. When installed on the motor vehicles, as seen in Figure 5 of the drawings, the instrument may be conveniently used to accurately ascertain the inclination of up and down grades.

It is believed that the many advantages of an inclinometer constructed in accordance with the present invention will be readily understood, and although a preferred embodiment of the instrument is as illustrated and described, it is to be understood that changes in the details of construction and in the combination and arrangement of parts may be resorted to which will fall within the scope of the invention as claimed.

What is claimed is:

1. An inclinometer comprising a dial, a bolt projecting centrally from the dial, a double-ended indicator journaled, at an intermediate point, on the bolt and cooperable with the dial, resilient clips on the indicator, and a spirit level mounted in said clips in parallelism with the indicator.

2. An inclinometer comprising a dial, a bolt projecting centrally from the dial, an elongated indicator pivotally and slidably mounted on the bolt, a retaining nut for the indicator threaded on the bolt, a coil spring encircling the bolt between the dial and the indicator and engaged with the latter for frictionally securing same in adjusted position, resilient clips on an edge of the indicator and a spirit level mounted in the clips of the indicator in parallelism therewith.

ERVIN EDWIN KROLL.